(12) United States Patent
Henderson et al.

(10) Patent No.: US 8,230,017 B2
(45) Date of Patent: Jul. 24, 2012

(54) OPTIMAL PAGE SHARING IN A COLLABORATIVE ENVIRONMENT

(75) Inventors: Roderick C. Henderson, Apex, NC (US); John R. Hind, Raleigh, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1785 days.

(21) Appl. No.: 11/087,890

(22) Filed: Mar. 23, 2005

(65) Prior Publication Data
US 2006/0218498 A1   Sep. 28, 2006

(51) Int. Cl.
*G06F 15/16*   (2006.01)
(52) U.S. Cl. ........ 709/205; 709/204; 382/232; 382/242; 382/243
(58) Field of Classification Search .......... 709/204–205; 382/232, 242, 243
See application file for complete search history.

(56) References Cited

U.S. PATENT DOCUMENTS

| | | | |
|---|---|---|---|
| 5,898,833 A | 4/1999 | Kidder | |
| 5,960,118 A * | 9/1999 | Briskin et al. | 382/243 |
| 6,154,771 A | 11/2000 | Rangan et al. | |
| 6,161,137 A | 12/2000 | Ogdon et al. | |
| 6,195,680 B1 | 2/2001 | Goldszmidt et al. | |
| 6,363,113 B1 | 3/2002 | Faryar et al. | |
| 6,370,508 B2 | 4/2002 | Beck et al. | |
| 6,598,075 B1 | 7/2003 | Ogdon et al. | |
| 6,606,413 B1 * | 8/2003 | Zeineh | 382/232 |
| 6,646,655 B1 | 11/2003 | Brandt et al. | |
| 7,353,252 B1 * | 4/2008 | Yang et al. | 709/204 |
| 2002/0034720 A1 | 3/2002 | McManus et al. | |
| 2002/0034721 A1 | 3/2002 | McManus et al. | |
| 2002/0112004 A1 | 8/2002 | Reid et al. | |
| 2002/0194216 A1 | 12/2002 | Kanno et al. | |
| 2003/0126027 A1 | 7/2003 | Nelson et al. | |
| 2003/0218554 A1 * | 11/2003 | McGuire | 341/65 |
| 2004/0103150 A1 | 5/2004 | Ogdon et al. | |
| 2004/0169873 A1 | 9/2004 | Nagarajan | |
| 2004/0212838 A1 | 10/2004 | Yamamoto et al. | |
| 2004/0249884 A1 * | 12/2004 | Caspi et al. | 709/204 |
| 2005/0175249 A1 * | 8/2005 | Ferlitsch | 382/243 |
| 2005/0234943 A1 * | 10/2005 | Clarke | 707/100 |
| 2006/0002614 A1 * | 1/2006 | LeHenaff | 382/242 |

FOREIGN PATENT DOCUMENTS

EP   1126721 B1   8/2001

* cited by examiner

*Primary Examiner* — Ario Etienne
*Assistant Examiner* — Michael C Lai
(74) *Attorney, Agent, or Firm* — Steven M. Greenberg, Esq.; Carey, Rodriguez, Greenberg & O'Keefe

(57) ABSTRACT

A method, system and apparatus for a collaborative system, method and apparatus configured for optimal page sharing. The system of the invention can include a collaborative application disposed in a collaborative peer and configured for communicative coupling to other collaborative peers. The system can further include a compressor/decompressor disposed in the collaborative peer. The compressor/decompressor can include logic programmed to pre-process a shared page for the collaborative application by compressing the shared page before transmitting the shared page to the other collaborative peers.

6 Claims, 2 Drawing Sheets

OPTIMAL PAGE SHARING IN A COLLABORATIVE ENVIRONMENT

BACKGROUND OF THE INVENTION

1. Statement of the Technical Field

The present invention relates to the field of page sharing and more particularly to the distribution of page imagery during an application sharing session between a multiplicity of application viewers.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Web conferencing, and application sharing.

In conventional application sharing, an application host can distribute imagery of an application operating in the host to one or more application viewers distributed about the computer communications network. The imagery can include not only the pages rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

Once a page has been captured and converted for transmission to coupled clients, the page can be compressed prior to its transmission to the coupled clients. The resulting compressed form of the page subsequently can be transmitted to the coupled clients so as to conserve bandwidth and to provide enhanced application performance. Still, if a page in a shared application incorporates complex graphics, the complex graphics will not compress as well as the remaining content of the page.

Additionally, pages which incorporate multiple, different graphics file formats have proven to be problematic in achieving favorable compression ratios. Finally, in many cases, the network throughput can be a limiting factor. Thus, as it will be apparent to the skilled artisan, application sharing can place a disproportionate stress on the resources of network components.

SUMMARY OF THE INVENTION

The present invention addresses the deficiencies of the art in respect to application sharing and provides a novel and non-obvious method, system and apparatus for a collaborative system, method and apparatus configured for optimal page sharing. The system of the invention can include a collaborative application disposed in a collaborative peer and configured for communicative coupling to other collaborative peers. The system can further include a compressor/decompressor disposed in the collaborative peer. The compressor/decompressor can include logic programmed to pre-process a shared page for the collaborative application by compressing the shared page before transmitting the shared page to the other collaborative peers.

The compressor/decompressor can include logic programmed to pre-process shared pages for the collaborative application by choosing a compression technique from among multiple compression techniques according to content in the shared pages and compressing the shared pages utilizing the chosen compression technique before transmitting the shared pages to the other collaborative peers. In this regard, the multiple compression techniques can include delta compression, fractal compression and substitutional compression.

A method for optimal image sharing in a collaborative environment can include selecting a page from among a set of application pages for transmission to a group of collaborative peers, and prior to transmitting the selected page to the collaborative peers, compressing the selected page. The compressing step can include selecting a particular compression technique from among a selection of compression techniques deemed optimal for content disposed in the selected page, and compressing the selected page using the particular compression technique. For instance, the compressing step can include partitioning the selected page into a set of regions and, for each of the regions, selecting a particular compression technique from among a selection of compression techniques deemed optimal for content disposed in a corresponding region. Finally, the selected regions can be compressed using the particular compression technique.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for optimal pgae sharing in a collaborative environment. In accordance with the present invention, client-side logic coupled to a collaborative application can pre-process pages produced by the shared application prior to transmitting the pages to collaborative peers in the collaborative environment. Specifically, when pre-processing a page, the client-side logic can select at least one region of the page for pre-processing and the client-side logic can select an optimal compressor for the selected region.

Subsequently, the region of the page can be compressed according to the selected compressor. Once compressed the different regions of the shared page can be transmitted for rendering in the collaborative peers. In this way, the resource intensive process of compressing the page can be performed in the client hosting the collaborative application rather than in the server environment. Consequently, the free resources of the client can be utilized in an optimal fashion while the limited resources of the server can remain free to handle other processing tasks.

Figure 1:
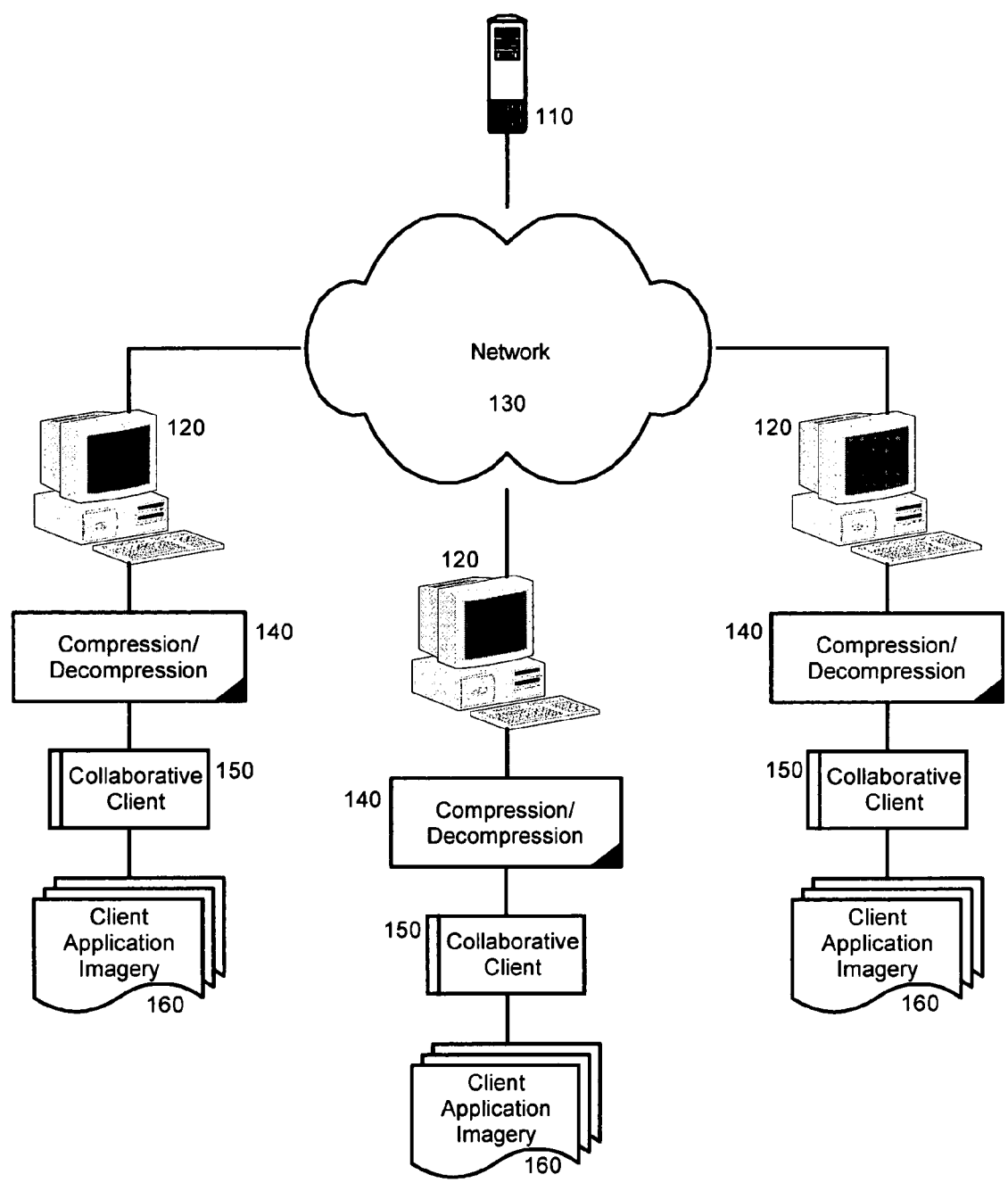
FIG. 1 is a schematic illustration of a collaborative system configured for optimal page sharing in accordance with the inventive arrangements; and, FIG. 2 is a flow chart illustrating a process for optimal page sharing through client-side image pre-processing and post-processing of shared pages in the system of FIG. 1.

In more particular illustration, FIG. 1 is a schematic illustration of a collaborative system configured for optimal page sharing in accordance with the inventive arrangements. As shown in FIG. 1, the system of the present invention can include one or more collaborative peers 120 communicatively coupled to a collaborative application server 110 over a computer communications network 130. Each collaborative peer 120 can include a collaborative application 150, for example an application sharing application, a presentation application, or a white boarding application. To that end, the collaborative application 150 can produce a discrete set of application pages 160 which when transmitted to others of the collaborative peers 120 and when rendered within the other collaborative peers 120, can simulate the real-time sharing of collaborative content.

Notably, each of the collaborative peers 120 can include pre-processing logic 140 configured to compress the client application pages 160 prior to transmitting the same through the network 130 to others of the collaborative peers 120. Likewise, the pre-processing logic 140 can be configured to decompress a compressed form of received application pages prior to rendering the same. Optionally, a buffer can be incorporated in each of collaborative peer 120 in order to facilitate the reconstitution of the application pages 160.

Significantly, as shown by the arrangement of FIG. 1, the resource consumptive process of compressing and decompressing the application pages 160 for a collaborative application 150 can be offloaded from the server 110 to the collaborative peer 120 where processing resources are in greater abundance.

In one aspect of the invention, different sets of application pages for a collaborative application can be processed before engaging in a collaborative session. In this regard, the different sets of application pages can be pre-compressed using a best compression technique available for the content of the application imagery. For instance, simple graphics can be compressed using substitutional compression, while more complex graphics can be compressed using fractal compression.

The sequence of rendering of the different sets of application pages further can be inferred from one or more off-line passes through the content of the collaborative application. By inferring the sequence of the different sets of application pages, delta encoding compression can be used to record merely the differences in content from one frame to the next. Optionally, the content of a region of a page can be set as needed to a color with a blending percentage of transparency with the previous frame. In this way, some regions need not be transmitted fully if a frame having a solid color background blends in any proportion with the background of a previous frame.

For example, in one aspect of the present invention as applied to a screen show presentation, the natural event-to-event presentation delay can be utilized to create an optimized set of compressed frames for each page of the presentation which can be passed directly to a collaborative meeting client when screen transitions are triggered in the presentation. The optimization can be further augmented by recording the generated compressed frames during an off-line preview of a presentation scenario. During this off-line process not only are the different regions of each page in the presentation compressed using the best technique available, but also the most likely presentation sequences for the pages of the presentation can be learned which can optimize the ability to delta encode page to page transitions.

To further facilitate the optimization of compression, each of the different sets of imagery can be apportioned into regions to account for mixed content type in each of the sets of imagery. For instance, using the foregoing exemplary approach, page n can be processed and distributed to the other peers in the collaborative meeting through a collaborative meeting application server as a series of optimally compressed regions. In this example, simple graphics in the upper right quadrant of a page may be LZ77 compressed while a photograph disposed in the lower left quadrant of the page may be fractal compressed. Finally, the upper left quadrant of the page may be a run length encoded difference from the previous page. In this regard, for pages n+1, n+2, etc., the regional deltas with the previous pages can be forwarded to the peers if they are determined to be smaller than the compressed representation of the current region of the page itself.

Figure 2:
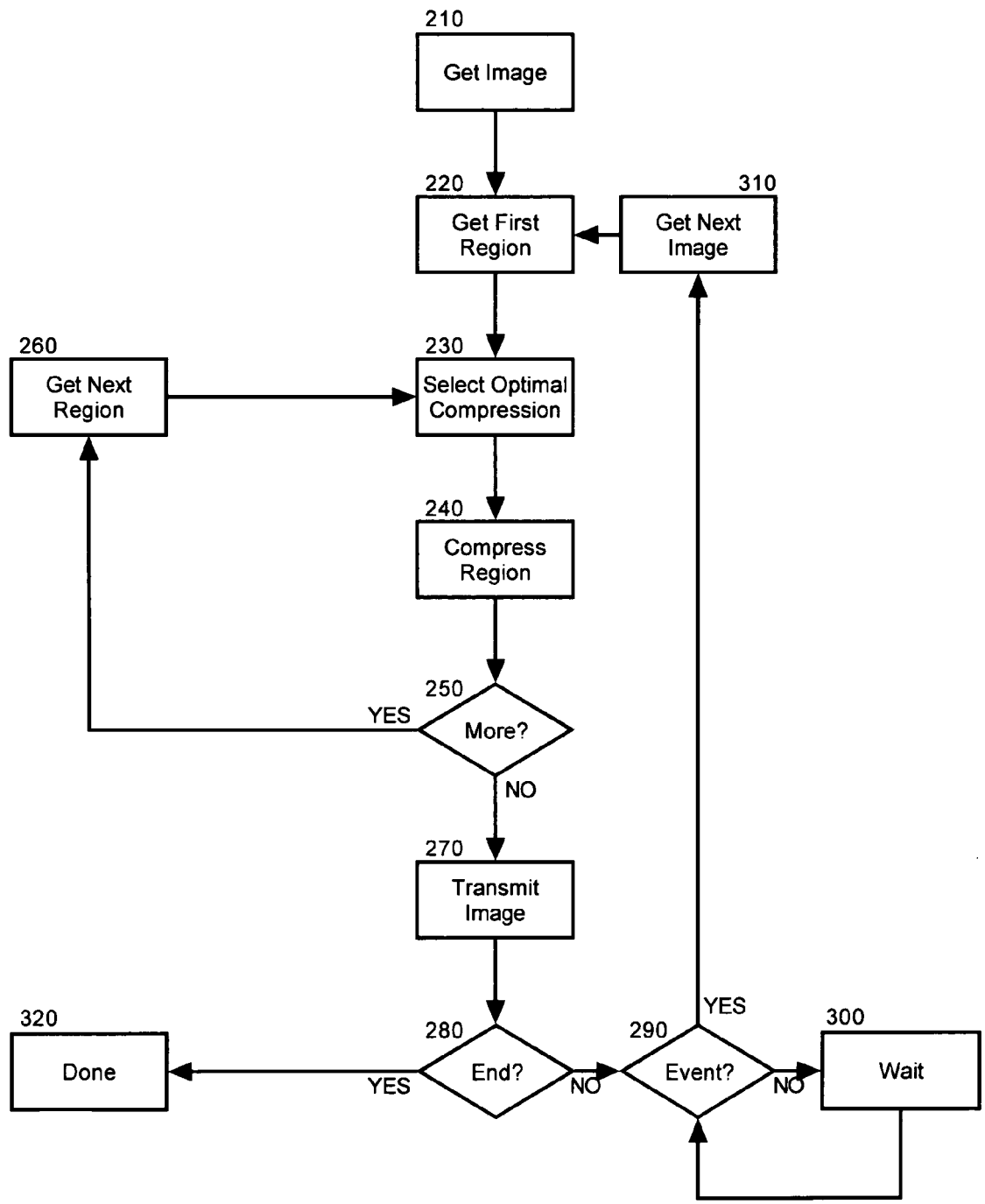

In more particular illustration, FIG. 2 is a flow chart illustrating a process for optimal page sharing through client-side image pre-processing and post-processing of shared imagery in the system of FIG. 1. Beginning in block 210, a first page for a collaborative application can be selected for processing. In block 220 a first region of the page can be further sub-selected for processing. In block 230, an optimal compression technique can be chosen to accommodate the nature of the content of the sub-selected region.

Once chosen, the chosen compression scheme can be applied to the content of the sub-selected region in block 240. In decision block 250, it can be determined whether addition regions in the selected page remain to be processed. If so, in block 260 a next region can be sub-selected for processing in the selected image. When the pertinent regions of the page have been processed with an appropriate compression scheme, in block 270 the page can be transmitted to the collaborative peers by way of an application server managing the collaborative session involving the shared application pages.

If in decision block 280, the session has not yet ended, in decision block 290 it can be determined whether an event has occurred which merits the transmission of a different shared page. If not, in block 300 a wait condition can occur. Otherwise, in block 310 a next page can be retrieved for processing and the methodology of blocks 210 through 280 can repeat. When no addition shared pages are to be processed, in block 320 the methodology of the present invention can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A collaborative computer hardware system configured for optimal page sharing, the system comprising:
   a collaborative peer hardware device configured to:
      determine a presentation sequence of application pages of a collaborative application by an off-line pass through of content of the collaborative application;
      select an application page based on the determined presentation sequence;
      prior to transmitting said selected application page to collaborative peers, compress said selected application page by
         partitioning said selected application page into a set of regions;
         for each region, selecting a particular compression technique from among multiple compression techniques based upon content disposed in said each region; and,
         compressing said each region using said particular compression technique;
      repeat the compression steps performed for the selected application page for all other application pages; and
      delta encode page to page transitions based on the determined presentation sequence.

2. The collaborative computer hardware system of claim 1, wherein
   said multiple compression techniques comprise delta compression, fractal compression and substitutional compression.

3. The collaborative computer hardware system of claim 1, wherein
   said collaborative application comprises a whiteboard application.

4. The collaborative computer hardware system of claim 1, wherein
   said collaborative application comprises a shared application.

5. A method for optimal image sharing in a collaborative environment, the method comprising the steps of:
   determining a presentation sequence of application pages of a collaborative application by an off-line pass through of content of the collaborative application;
   selecting an application page based on the determined presentation sequence;
   prior to transmitting said selected application page to collaborative peers, compressing said selected application page, wherein said compressing step comprises the steps of:
      partitioning said selected application page into a set of regions;
      for each region, selecting a particular compression technique from among multiple compression techniques based upon content disposed in said each region; and,
      compressing said each region using said particular compression technique;
   repeating the compression steps performed for the selected application page for all other application pages; and
   delta encoding page to page transitions based on the determined presentation sequence.

6. A machine readable storage having stored thereon a computer program for optimal page sharing in a collaborative environment, the computer program comprising a routine set of instructions which when executed by a machine causes the machine to perform the steps of:
   determining a presentation sequence of application pages of a collaborative application by an off-line pass through of content of the collaborative application;
   selecting an application page based on the determined presentation sequence;
   prior to transmitting said selected application page to collaborative peers, compressing said selected application page, wherein said compressing step comprises the steps of:
      partitioning said selected application page into a set of regions;
      for each region, selecting a particular compression technique from among multiple compression techniques based upon content disposed in said each region; and,
      compressing said each region using said particular compression technique;
   repeat the compression steps performed for the selected application page for all other application pages; and
   delta encoding page to page transitions based on the determined presentation sequence.

* * * * *